United States Patent [19]

McDonald

[11] 3,979,127
[45] Sept. 7, 1976

[54] RECORD PLAYERS
[76] Inventor: Daniel McLean McDonald, 28 Chemin de Bellefontaine,, 1223 Cologny, Geneva, Switzerland
[22] Filed: Jan. 23, 1975
[21] Appl. No.: 543,267

[30] Foreign Application Priority Data
Jan. 31, 1974 United Kingdom............... 4555/74

[52] U.S. Cl............................................. 274/10 R
[51] Int. Cl.²........................................ G11B 15/00
[58] Field of Search ............................... 274/10 R

[56] References Cited
UNITED STATES PATENTS

| | | | |
|---|---|---|---|
| 2,283,841 | 5/1942 | Wright | 274/10 R |
| 2,752,159 | 6/1956 | Bacher | 274/10 R |
| 2,818,263 | 12/1957 | Dale | 274/10 R |
| 2,868,547 | 1/1959 | Vistain | 274/10 R |
| 3,342,499 | 9/1967 | Fukuda et al. | 274/10 R |
| 3,697,087 | 10/1972 | Takahashi | 274/10 R |

Primary Examiner—Richard E. Aegerter
Assistant Examiner—John W. Shepperd
Attorney, Agent, or Firm—Burgess Ryan and Wayne

[57] ABSTRACT

An automatic record player in which the mechanism for pivoting the pick-up arm inwardly and outwardly relative to the turntable includes a first reciprocatably rotatable member and a second similar member releasably connectable to the first member to be driven thereby and releasably connectable to the pick-up arm vertical spindle to drive the pick-up arm inwardly relative to the turntable, the first member being releasably connectable to the pick-up arm vertical spindle to drive the pick-up arm outwardly relative to the turntable.

13 Claims, 3 Drawing Figures

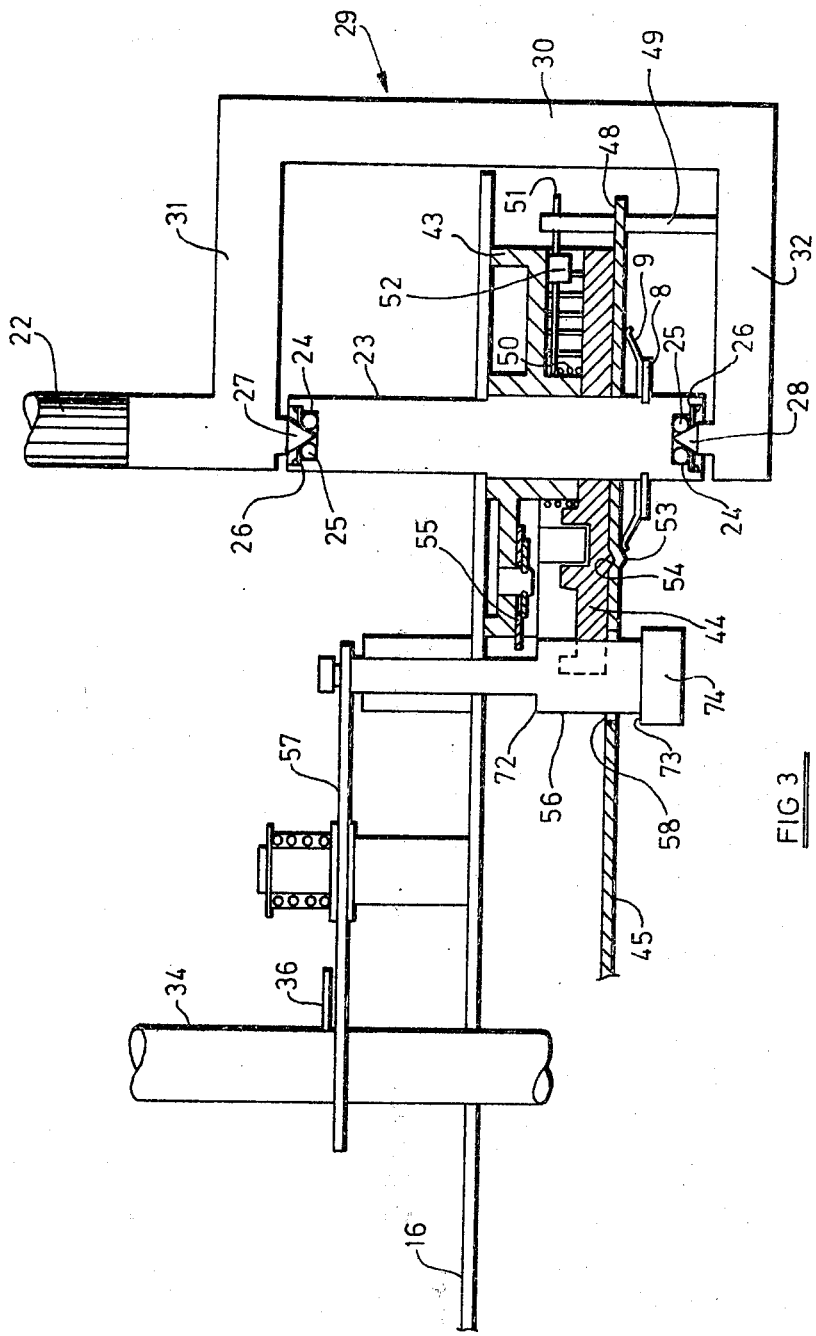

RECORD PLAYERS

BACKGROUND OF THE INVENTION

1. Field of the Invention.

This invention relates to an automatic record player for playing disc records of different sizes of the type, hereinafter referred to as the type specified, comprising a deck plate, a turntable rotatably mounted on the deck plate and driven, in use, by an electric motor, a centre spindle extending upwardly from the centre of the turntable from which records are fed singly in succession from the bottom of a stack onto the turntable or onto a record or records already on the turntable, a pick-up arm pivotally mounted for movement about a horizontal axis on the upper end of a vertical spindle, the vertical spindle being pivotally mounted for movement about a vertical axis relative to the deck plate, a drive member rotatably mounted on the deck plate and means for rotating the drive member during a record changing cycle.

In such a known apparatus there is automatic mechanism, driven from the drive memember, which, after playing each record, causes a cycle of operations to take place, which includes pivoting the pick-up arm about said horizontal axis to raise the pick-up arm to disengage the pick-up from the record, then pivoting the vertical spindle to swing the pick-up arm outwardly to a position clear of the path of downward movement of the next record to be played, then releasing the lowermost record from the stack to drop onto the turntable, then pivoting the vertical spindle about said vertical axis to swing the pick-up arm inwardly to position the pick-up over the edge of the record to be played and then pivoting the pick-up arm about the horizontal axis to engage the pick-up with the record.

SUMMARY OF THE INVENTION

An object of the present invention is to provide a new and improved record player of the type specified.

According to the present invention I provide a record player of the type specified including an automatic mechanism for raising and lowering the pick-up arm and for pivoting the pick-up arm inwardly and outwardly relative to the turntable, the mechanism including a first reciprocatably rotatable member, means driven from the drive member to reciprocatably rotate the first member, a second reciprocatably rotatable member releasably connectable to the first member to be driven thereby and releasably connectable to the pick-up arm vertical spindle to drive the pick-up arm inwardly relative to the turntable, and stop means to arrest rotation of the second member when the pick-up arm is in a predetermined position whereby rotation of the first member in one direction causes rotation of the second member to drive the pick-up arm inwardly relative to the turntable whilst permitting continued movement of the first member after movement of the second member has been arrested by the stop means.

The first member may be releasably connectable to the pick-up arm vertical spindle to drive the pick-up arm outwardly relative to the turntable, and there being further stop means to arrest outward movement of the pick-up arm in a predetermined position, whereby rotation of the first member in the opposite direction drives the pick-up arm outwardly relative to the turntable whilst permitting continued movement of the first member after movement of the vertical spindle has been arrested by the further stop means.

The second member may be releasably connectable to the first member by torque limiting means.

Preferably said first and second members are mounted for rotation about the axis of rotation of the pick-up arm vertical spindle.

The first member may be provided with a spring biased abutment adapted to engage an element, drivingly associated with the pick-up arm spindle, to rotate the vertical spindle in a direction to move the pick-up arm outwardly relative to the turntable, the second member having a further abutment adapted to engage said element to rotate the vertical spindle in the opposite direction and the torque required to disengage said torque limiting means being greater than that required to displace said spring biased abutment against its spring biasing means whereby on rotation of the first member in said one direction the second member is rotated by the first member through said torque limiting means to drive the pick-up arm vertical spindle as a result of engagement of the element by the further abutment to move the pick-up arm inwardly and whereupon, when said rotation of the second member is stopped when the pick-up arm is in said predetermined position, the torque limiting means is disengaged to permit continued rotation of the first member, and the spring biased abutment is moved out of engagement with the element, whilst on rotation of the first member in said other direction continuing movement of the first member is permitted, after movement of the pick-up arm outwardly of the record has been arrested, as a result of displacement of the spring biased abutment against its spring biasing means.

BRIEF DESCRIPTION OF THE DRAWINGS

One embodiment of the invention will now be described in more detail by way of example with reference to the accompanying drawings wherein:

FIG. 3 is a diagrammatic cross-sectional view to an elongated scale on the line 3 — 3 of the record player of FIG. 2 with parts omitted for clarity.

DESCRIPTION OF THE PREFERRED EMBODIMENT

Figure 1:
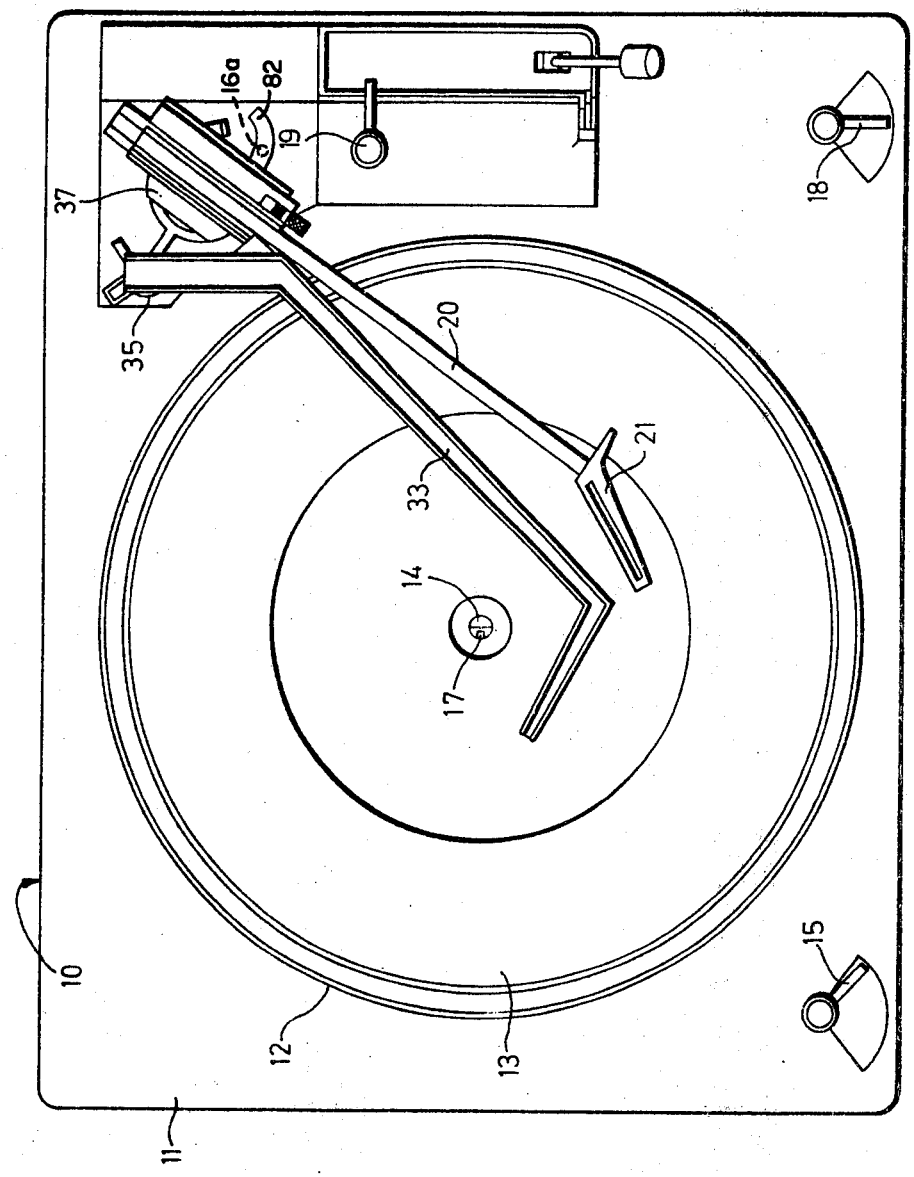
FIG. 1 is a diagrammatic plan view of a record player embodying the invention

Referring to the Figures a record player is indicated generally at 10 and comprises a deck plate 11 having a circular well 12 formed therein within which a turntable 13 is rotatably mounted about a vertical axis 14 and is driven by means of an electric motor, not shown, in conventional manner by means of a jockey pulley interposed between the rim of the turntable and a stepped spindle, not shown, of the motor.

Record speed change means are provided to permit the speed of rotation of the turntable to be adjusted to any one of the usual desired speeds, namely 78 r.p.m., 45 r.p.m. and 33⅓ r.p.m. The record speed change mechanism comprises a hand engageable member 15 connected to a rotary cam member, not shown, which engages one end of a two armed lever pivotally and slidably mounted on the deck plate 11. At its other end the lever carries the jockey pulley.

As the hand engageable member 15 is rotated the cam member causes the two armed lever to be moved vertically up and down so that the jockey pulley can be engaged with a desired one of the steps on the stepped motor spindle. In addition, as the two armed lever is moved between the steps on the spindle both in an upward and downward direction the lever is rotated to lift the jockey pulley out of engagement with the spindle.

A centre spindle 17 (see FIG. 1) of conventional form is provided in the centre of the turntable 13 to support a stack of records thereon in conventional manner. The centre spindle 17 has the usual rocking lever and ledge to enable a single record to be dropped from the bottom of a stack of records onto the turntable 13 or onto the top of a record or records already on the turntable. The record player may, if desired, be provided with any other desired type of centre spindle such as the type generally referred to as an umbrella spindle. The deck plate 11 is provided with a manually operable "on/off" lever 18 and a manually operable record size selector lever 19.

Figure 2:
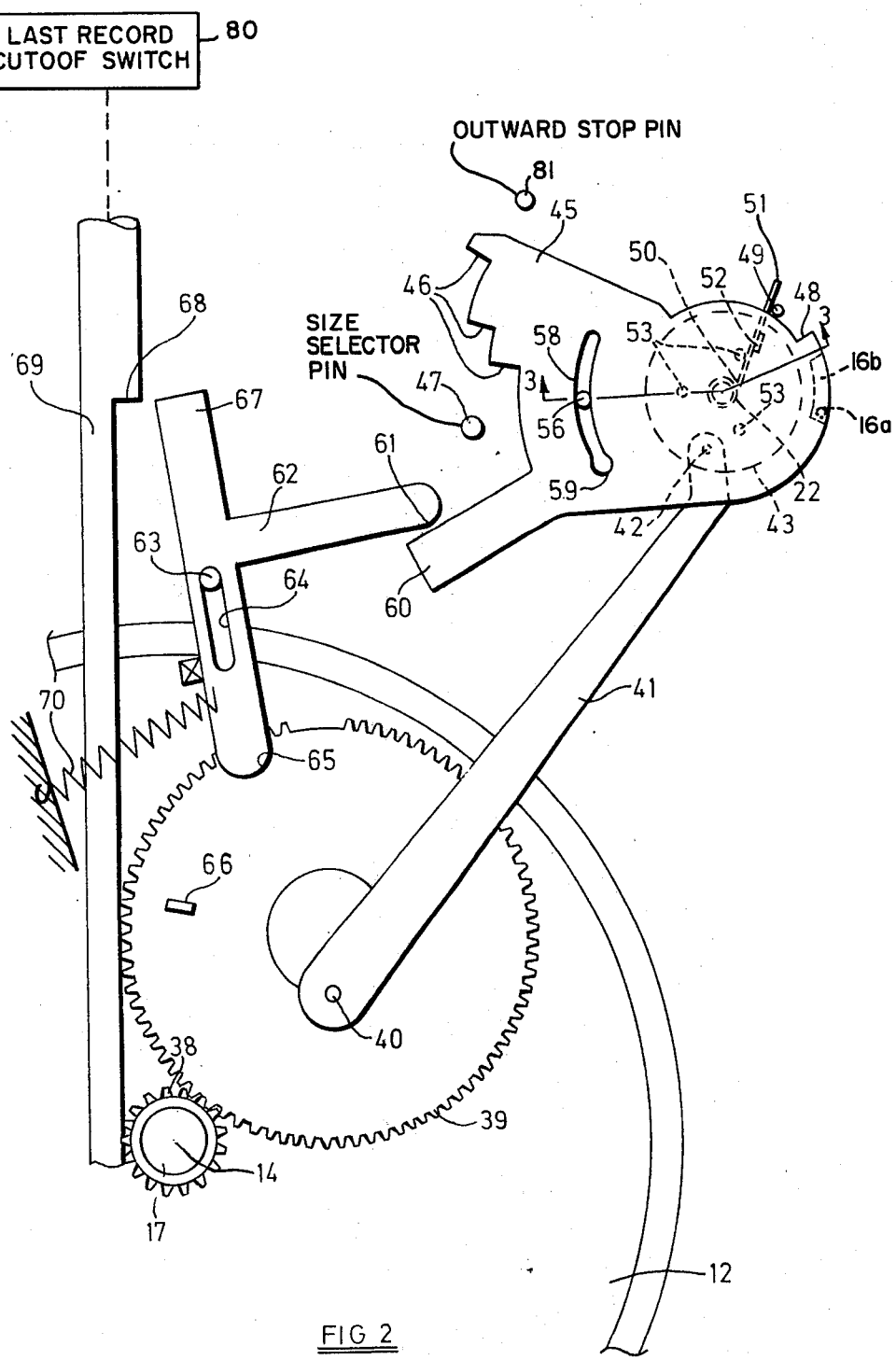
FIG. 2 is a diagrammatic fragmentary underneath plan view to an enlarged scale of part of the record player of FIG. 1 with parts omitted for clarity.

Referring now particularly to FIG. 2, a sub-plate 16 is mounted beneath the deck plate 11. A pick-up arm 20 carrying a pick-up head 21 is mounted, on the upper end of a vertical spindle 22, for up and down movement about a horizontal axis and the vertical spindle 22 is mounted, on the sub-plate 16, for movement about a vertical axis to allow swinging movement of the pick-up arm 20 inwardly and outwardly relative to the turntable 13.

The pick-up arm vertical spindle 22 is mounted on the sub-plate 16 in the following manner. A cylindrical pick-up arm vertical spindle support 23 is mounted on the sub-plate 16 and has a counter-bored cylindrical recess 24 at each end. Engaged within the smaller part of each recess are a number of balls 25 or other rolling elements, for example five, a washer 26 is positioned in the larger diameter part of each recess and rests on the shoulder between the two parts of the recess. Three lugs, equally spaced apart around the periphery of the washer, are staked out of the wall of the larger diameter part of the support and secure the washers in position which thus maintains the balls in position.

A conical pivot element 27 is provided, on the lower end of a main part of the spindle 22, and projects downwardly and engages in the recess at the top of the support 23 whilst a second conical element 28 is provided on an extension part 29 of the spindle to extend upwardly and engage with the balls in the recess on the lower end of the spindle support 23. The extension part 29 of the spindle 22 upon which the second conical element 28 is provided includes a longitudinally extending part 30 which is laterally off-set from the longitudinal axis of the main part of the spindle 22 and is connected to the remainder of the spindle 22 by a horizontally extending part 31, the second conical element 28 being carried on a second horizontally extending part 32 at the lower end of the off-set part 29. The conical pivot elements pass through the central aperture of each washer to engage the balls received in the respective recesses so that the spindle is mounted for rotation relative to the support 23 as a result of relative rotation between the conical pivot elements and the spindle support through the intermediary of the balls. Although five balls have been described if it is desired either more or less balls may be provided.

A record steady lever 33 is pivotally and slidably mounted on the deck plate 11 in conventional manner by means of a spindle 34, the lower end of which is engaged in an aperture in the sub-plate 16, and the upper end of which is journalled in a bearing provided on a boss 35 upstanding from the deck plate. The spindle 34 carries a radial projection 36. Engaged around the spindle 34 between the projection 36 and the upper end of the boss 35 is a coil compression spring, not shown, which urges the spindle 34, and hence the record steady lever 33, downwardly to supplement the effect of gravity thereon.

A pick-up arm raising spindle 16a is mounted in an aperture in the sub-plate 16 and in a boss, not shown, on the deck plate for sliding up and down movement in a vertical direction, the upper end of the raising spindle engages a portion 37 of the pick-up arm 20, for example the pin 16a may engage arcuate plate 82, so that the pick-up arm is pivoted up and down about its horizontal axis under the action of the up and down movement of the raising spindle.

The turntable 13 has a pinion 38 formed integrally therewith and surrounding the centre spindle 17 and adapted to engage with gear teeth provided on a drive member in the form of a gear 39 rotatably mounted on the sub-plate 16. The drive gear 39 has a number of teeth omitted and is provided with a pawl mechanism of conventional form so that when a record changing cycle of operations is desired the pawl is moved into position for engagement by a dog, not shown, provided on the turntable above the pinion 38 to initiate rotation of the drive gear 39 and engage the teeth thereof with the pinion 38. When the drive gear has been rotated through a single revolution the gap in the teeth is again aligned with the pinion and the pawl mechanism has been moved out of position for engagement with the dog and hence the drive gear is rotated through only a single revolution.

The drive gear 39 has a crank-pin 40 provided thereon to which a drive link 41 is pivotally connected. The other end of the drive link 41 is pivotally connected by a pin 42 to a drive element 43, which comprises a first reciprocatably rotatable member, and which is reciprocatably rotated by the drive gear 39 through the crank pin 40 and drive link 41.

The drive element 43, which is made as a moulding in a suitable synthetic plastics material such as nylon, is mounted for rotation about the support 23 and hence for rotation about the axis of pivot of the pick-up arm spindle 22. On its upper surface the element 43 is provided with a cam track 16b for engagement by the lower end of the pick-up arm raising spindle.

The drive element 43 is provided with a cover plate 44 also made as a moulding in a suitable synthetic plastics material such as nylon and drivingly connected to the drive element 43 by any suitable means.

Also mounted for rotation about the support 23 is a selector plate 45 made as a steel pressing and which comprises a second reciprocatably rotatable member. A spring plate 9 is engaged between an abutment 8 on the support 23 and resiliently biases together the selector plate 45, cover plate 44 and drive element 43.

The selector plate 45 is provided with three recesses 53 arranged at equi-angularly spaced positions around the support 23 whilst the cover element 44 is provided with three corresponding projections 54 which can be received within the recesses 53. Thus the selector plate 45 is releasably connectable to the drive element 43 by the recesses and projections and can thus be reciprocatably rotated by the drive element 43 through a torque limited driving connection provided by the recess and projections. If desired, apertures, instead of recesses may be provided and herein the term "recess" will be used to refer to both. Moreover, less than three, for example one, or more than three, sets of recesses and projections may be provided and if desired the projections may be on the selector plate and the recesses formed in the cover elements.

The selector latch plate is provided with three steps 46 in its periphery for engagement with a stop 47 which is movable radially inwardly towards the axis of rotation of the plate 45 so as to be in position for engagement with a desired one of the three steps 46 thus providing a stop to limit rotation of the selector plate 45. The stop is connected to the manual record size selector lever 19 so that operation of the lever 19 to adjust the radial position of the stop 47 permits adjustment of the extent of pivotal movement of the selector plate 45 and hence of pivotal movement of the pick-up arm spindle, as hereinafter to be described in more detail, so that the pick-up arm is moved into the correct position for the size of record to be played.

The selector plate 45 is provided with an abutment surface 48, which can engage an upstanding pin 49 provided on the horizontal part 32 of the extension part 30 of the pick-up arm vertical spindle 22, and thus comprises an abutment, herein referred to as a further abutment, which releasably connects the selector plate 45 to the vertical spindle 22.

A torsion spring 50 is also mounted around the support 23 and has an end anchored to the drive element 43 whilst its other end 51 projects radially outwardly to engage the pin 49, on the opposite side thereof to that which is engaged by the abutment surface 48. The end 51 thus comprises a spring biased abutment which releasably connects the drive element 43 to the vertical spindle 22. The drive element 43 is provided with a downwardly depending lug 52 to engage the spring 50 normally to maintain the spring in a stressed condition in which it is urged against the lug 52.

The drive element 43 is provided with a spring loaded latch plate 55 which is spring urged outwardly of the periphery of the drive element and is adapted to be engaged by a shouldered peg 56 mounted for sliding movement in a direction normal to the deck plate and which is connected by spring loaded lever 57 to the hereinbefore mentioned transversely extending projection 36 on the record steady lever spindle 34. This peg 56 also extends through an arcuate slot 58 provided in the selector latch 45, the arcuate slot having an enlarged portion 59 at one end thereof.

The selector plate 45 is provided with an extension part 60 adapted to engage a part 61 of a switch off lever 62 pivotally and slidably mounted on the deck plate by means of a pin 63 received in a slot 64 in the lever 62. The lever 62 at one end 65 is adapted to be engaged, when the lever 62 is moved as hereinafter to be described, by an abutment 66 on the drive gear 39 and at its other end 67 to engage a step 68 in a cut off slide 69 connected to the on/off switch 80 of the record player. A coil tension spring 70 biases the lever 62 in a clockwise direction as seen in FIG. 3.

Conventional means to operate the centre spindle are provided.

The operation of the record player will now be described and in the following description all directions of rotation will be described as seen in underneath plan view, i.e. as shown in FIG. 3.

The performance of a normal cycle of operations will be described. The record having just been played the pick-up arm will be in its innermost position and the mechanism is required to lift the pick-up arm to lift the pick-up out of contact with the record, to pivot the pick-up arm outwardly, i.e. in a clockwise direction as seen in FIG. 2, until it is above its rest, to drop a record onto the turntable, to pivot the pick-up arm inwardly, i.e. anti-clockwise, until the pick-up is above the entry groove of the size of record to be played and then the arm has to be lowered to lower the pick-up on to the record.

The drive gear 39 is caused to start to rotate, clockwise, in conventional manner by operation of the pawl mechanism. Rotation of the drive gear 39 causes movement of the drive link 41 and hence causes initiation of pivotal movement of the drive element 43 in a clockwise direction. This rotary movement causes, initially, the pick-up arm lifting spindle to be moved upwardly as a result of engagement with the cam track on the upper surface of the drive element 43 thereby initially lifting the pick-up arm. During this phase of movement the part 51 of the spring 50 is moved towards the pin 49 attached to the lower end of the pick-up arm vertical spindle 22.

When the pick-up arm has been thus raised the part 51 of the spring engages the pin 49 and starts to move the pick-up arm outwardly towards its rest. During this phase of movement the selector plate 45 is likewise pivoted clockwise as a result of friction between the plate and the projections 54 or as a result of engagement of the projections 54 in the recesses 53, or as a result of engagement of the pin 49 with the further abutment surface 48. When the pick-up arm has been moved outwardly so that it is above its rest further outward movement of the pick-up arm is prevented and hence so is further rotation of the pin 49 but the drive element 43 continues to rotate and this causes the spring 50 to be stressed further and to be moved away from the lug 52.

The spring 50 therefore acts as a lost motion device permitted continued rotation of the drive element after movement of the pick-up arm has been arrested. During this rotational movement of the drive element 43 the selector plate 45 is rotated to cause the extension part 60 thereof to engage the part 61 of the switch off lever 62 to pivot it anti-clockwise to move the end 65 thereof into the path of movement of the abutment 66.

When the selector plate has moved sufficiently far it engages a stop such as outward stop pin 81, chosen arbitarily which prevents further movement of the plate whilst the drive element 43 continues to rotate to disengage the projections and depressions 53, 54 if they have up to this time been engaged, or to engage the projections and depressions and then, as a result of continued relative rotation to disengage them, if they have not hitherto been engaged. This is to ensure that on relative movement between the drive element 43 and selector plate 45 in the reverse direction the projections and recesses 53, 54 will be moved into engagement.

During this last stage of rotation of the drive element 43, i.e. when the drive gear has turned through about 140° the mechanism for actuating the rocking lever of the spindle is operated and the lowermost record of the stack is dropped towards the turntable.

As the drive gear 39 continues to rotate it causes the drive link 41 to commence rotation of the drive element 43 in an anti-clockwise direction as seen, it will be remembered, in FIG. 3.

On this anti-clockwise, return, movement of the drive element 43 the extension part 60 of the selector latch moves away from the part 61 of the switch off lever 62 and allows the switch off lever to rotate clockwise. Thus, the switch off-lever 62 is permitted to move so that the end 65 thereof is moved out of position for engagement by the abutment 66 on the drive gear 39 so that switch off does not occur.

Continued movement of the drive element 43 causes engagement of the recesses and projections thus connecting the selector plate 45 to the drive element 43 and causing it to rotate anti-clockwise therewith. This anti-clockwise movement of the selector plate 15 moves the abutment surface 48 thereof into engagement with the pin 49 fixed to the pick-up arm spindle which as mentioned hereinbefore, is already engaged by the stressed spring 50.

The engagement between the projections and recesses is such that the torque required to break this connection is greater than the torque applied to the pin 49 by the part 51 of the spring 50 and thus the effect is for the pin 49 to be urged by the spring 50 into engagement with the further abutment surface 48 but for the abutment surface 48 to rotate the pin anti-clockwise, and hence to rotate the pick-up arm, in the direction inwardly towards the periphery of the record to be played. Because the pin 49 is trapped between the surface 48 and the spring 50 the movement of the control arm is rigidly controlled. This movement continues until one of the surfaces 46 of the selector plate engages the stop 47, the position of the stop 47 having been chosen, as hereinbefore described, in accordance with the size of record which it is desired to be played. The movement of the selector plate is thus arrested and hence the movement of the pick-up arm is also arrested as there is no drive now communicated to the pin 49 in the direction to move the arm inwardly.

When the selector plate 45 is thus stopped the drive element 43 continues to rotate due to continued movement of the link 41; after a small amount of such continued rotation of the drive element 43 the lug 52 engages the part 51 to overcome the resilient bias of the spring 50 and so to lift the part 51 away from the pin 49 and then the projections and recesses 53 and 54 are disengaged.

It will be seen that if the positive connection between the drive element 43 and the selector plate 45 afforded by the projections and recesses, were broken before the part 51 contacts projection 52, the spring would force the pin and selector plate backwards, and the pick-up arm would be displaced outwardly out of position. Thus it is necessary for there to be sufficient force holding drive element 43 and the selector latch 45 together during the small movement permitting the projection 52 to reach the part 51 to overcome the resilient biasing force of the spring 50.

This can be achieved by making the projections and recesses of a suitable shape.

One arrangement, which is that of the present example, it to provide conical projections of sufficient diameter engaged with corresponding conical depressions. The mutual force between the drive member 43 and the selector plate 45 would last during a relative rotation between the two over a circumferential movement of half the diameter of the projection.

After disengagement of the projections and recesses the drive element 43 continues to rotate to move the spring 50 further away from the pin 49 by a sufficient distance to permit free movement of the pin 49 during playing of a record. In addition the pick-up arm raising spindle is lowered to lower the pick-up into contact with the record.

As mentioned above, if the above described delay in disengagement of the recesses and projections until the lug 52 has engaged the spring 50 were not provided, then upon disengagement of the recesses and projections the spring 50 would then urge the pin 49 clockwise with sufficient torque to overcome the residual friction between the drive element 43 and the selector plate 45 and so would displace the pin 49 and selector plate 45 in a clockwise direction until the clockwise movement of the spring caused engagement of the spring with the lug 52, with the result that the pick-up would not be lowered into the correct position on the record to be played.

The rotation of the drive gear is then arrested due to the toothless region thereof being again aligned with the pinion on the turntable and the cycle of operations is completed.

A switch-off cycle of operations will now be described. In the penultimate cycle of operations and when the last record has been dropped onto the turntable, the record steady lever is caused to move further downwardly and this causes the hereinbefore mentioned peg 56 to move upwardly so that a shoulder 72 thereon rests on the spring loaded latch 55 mounted on the drive element 43. Due to the restricted arcuate extent of the latch 55, on the return movement of the drive member 43 the latch 55 is moved out of engagement with the shoulder of peg 56 which now moved upwardly again until shoulder 73 rests on the arcuate slot in the selector plate 45. It remains in this position until the last cycle.

During the last cycle of operations on the clockwise movement of the drive element the spring loaded latch 55 is displaced inwardly as a result of engagement with the larger diameter part of the peg and when the selector plate 45 has been moved, as a result of this clockwise movement of the drive element, the shoulder 73 of the peg 56 which has been resting upon the smaller cross-section part of the arcuate slot 58 in the selector plate 45 is aligned with the larger diameter part 59 and the peg can pass therethrough.

On return movement of the drive element 43 in an anti-clockwise direction, movement of the selector plate 45 cannot occur as it is prevented from so doing due to the engagement of the larger diameter part 74 of the peg 56 in the large diameter part 59 of the slot 58 in the selector plate preventing movement of the selector plate. The selector plate 45 is therefore held in this position, in which the pick-up arm is in alignment with its rest, during the remainder of the cycle of operations so that not only is the pick-up arm not pivoted further inwardly but also the hereinbefore mentioned extension part 60 of the selector plate maintains the switch-off lever 62 in position for the end 65 thereof to be engaged by the abutment 66 of the drive gear 39 so that continued rotation of the drive gear 39 causes movement of the switch-off lever 62 in the direction to displace the cut off slide 69 to switch off the record player. After switch off of the record player the spring 70 returns the switch off lever 62 to its original position, as described below.

On starting operation of the record player after switch off and lifting the record steady lever the hereinbefore mentioned peg is lowered thereby rendering the selector plate again free to move. Thus, during the first part of the first cycle of operations no movement of the selector plate occurs as it is already in the position which it will occupy at the end of this first part of the cycle. Upon the return or anti-clockwise movement of the drive gear 43 the selector plate is moved anti-clockwise as described hereinbefore in connection with the normal cycle of operations and thus the end 65 of the switch off lever 62 is moved out of position for engagement with the drive gear and thus not only is the pick-up arm moved inwardly to the desired position but also the selector plate is moved out of position for switch-off.

It will be appreciated that the mechanism hereinbefore described is both simple and compact and requires only a very small number of parts and that all the parts can be provided in the direct vicinity of the pick-up arm vertical spindle.

It will be appreciated that this is rendered possible by the configuration of the off-set part of the pick-up arm vertical spindle which affords the mounting therefore.

Although, as described in the embodiment hereinbefore, the drive element cover plate and selector plate are described as being mounted for rotation about the axis of rotation of the pick-up arm vertical spindle if desired they could be mounted at some other position and their movement connected by suitable drive means to the spindle.

Although in the above described example a crank and connecting rod 41 has been described as being the means for communicating the reciprocatable rotary movement to the drive element 43, if desired any other suitable means may be provided to reciprocatably rotate the drive element 43, such as an eccentric.

Moreover, although one particular arrangement for achieving switch-off of the record player has been described hereinbefore, it will be appreciated that if desired any other convenient means for causing switch-off of the record player may be provided.

I claim:

1. An automatic record player for playing disc records of different sizes comprising,
  a deck plate,
  a turntable rotatably mounted on said deck plate,
  a centre spindle extending upwardly from the centre of said turntable from which records are fed singly in succession from a bottom of a stack onto said turntable,
  a vertical spindle pivotally mounted for movement about a vertical axis relative to said deck plate,
  a pick-arm pivotally mounted for movement about a horizontal axis on the upper end of said vertical spindle,
  a drive gear rotatably mounted on said deck plate,
  means for rotating said drive gear during a record changing cycle,
  automatic mechanism for raising and lowering said pick-up arm for pivoting said pick-arm inwardly and outwardly relative to said turntable,
  said automatic mechanism including,
  a first reciprocatably rotatable memeber,
  means driven from said drive gear to reciprocatably rotate said first member;
  a cam track on said first member engaged by a pick-up arm raising spindle to raise and lower said pick-up arm,
  a second reciprocatably rotatable member,
  a torque limiting means to releasably connect said second member to said first member to be rotated thereby, said torque limiting means mounted to releasably interconnect said first and second members at determined angular displacements,
  an element connected to said vertical spindle,
  spring means provided on said first member, said spring means being positioned to apply torque to said element to thereby rotate said vertical spindle in a direction to move said pick-up arm outwardly relative to said turntable, and an abutment on said first member positioned to limit the angular movement of said spring means,
  stop means positioned to arrest outward movement of said pick-up arm in a predetermined position,
  an abutment fixed relative to said second member adapted to engage said element to rotate said vertical spindle in the opposite direction, and
  further stop means to arrest rotation of said second member when said pick-up arm is in a predetermined position,
  the torque required to disconnect said torque limiting means being greater than the torque applied by said spring means to said element.

2. A record player according to claim 1 wherein said second reciprocatably rotatable member comprises part of a selector plate provided with abutment surfaces adapted to be engaged by an adjustable stop to permit adjustment of said predetermined position at which inward movement of said pick-up arm is arrested.

3. A record player according to claim 2 including a record steady lever movable from a first to a second position when there is no record to be played carried on said centre spindle, means to maintain said selector plate in a switch-off position when said record steady lever is in said second position, an element rotatable with said drive gear, a switch-off actuating lever movable to switch-off the record player and mounted to be maintained, by said selector plate when said selector plate is in said second position, in a position to engage said last mentioned element whereby said last mentioned element causes movement of said actuating member to switch off the record player.

4. A record player according to claim 3 wherein said means to restrain said selector plate in said position comprises an arcuate slot formed in said selector plate having an enlarged portion at one end, there being a stop member having an enlarged part of such dimensions as to not pass through a majority of said arcuate slot but to enter said enlarged part, said stop member being normally maintained in a first position in which the smaller part thereof is aligned with said slot by said record steady lever when said lever is in said first position and being moved into a second position such that the enlarged part thereof can enter the enlarged part of the slot by said record steady lever when said lever is permitted to move to said second position.

5. A record player according to claim 4 wherein said stop member is caused to move to said second position as a result of biasing movement being applied thereto when said record steady lever is moved to its second position and there being a latch plate provided on said first reciprocatably rotatable member which temporarily maintains said stop member in its first position whilst said pick-up arm is moved outwardly to said predetermined position and subsequently permits said stop member to move to its second position.

6. A record player according to claim 2 wherein said selector plate is provided with means to engage a switch-off actuating lever and there being means to restrain the selector plate in a position in which said actuating lever is maintained in position for engagement by an element driven from the drive member to cause switch-off, when a record steady lever senses that there is no record to be played carried on the centre spindle.

7. A record player according to claim 1 wherein said torque limiting means comprises a plurality of interengageable drive transmitting abutments provided on said first and second members and means to bias the abutments into drive transmitting relationship when the torque to be transmitted thereby does not exceed a predetermined value and to permit said last mentioned abutments to disengage from drive transmitting relationship when the torque to be transmitted is at or exceeds the predetermined value.

8. A record player according to claim 7 wherein said drive transmitting abutments comprise conical depressions and recesses.

9. A record player according to claim 1 wherein said spring means comprises a torsion spring having an end part positioned to engage said element and fixed at its opposite end to said first member and encircling the axis of rotation thereof, there being a stop member on said first member towards which said end part is resiliently biased, said stop member serving to move said end part out of engagement with said element.

10. A record player according to claim 1 wherein said first and second members are mounted for rotation about the axis of rotation of said pick-up arm vertical spindle.

11. A record player according to claim 1 wherein said first member is driven from said drive member by means of a drive link pivotally connected to said first member and said drive member about axes parallel to, and spaced from, their respective axes of rotation.

12. An automatic record player for playing disc records of different sizes comprising,
a deck plate,
a turntable rotatably mounted on said deck plate,
a centre spindle extending upwardly from the centre of said turntable from which records are fed singly in succession from a bottom of a stack onto said turntable,
a vertical spindle pivotally mounted for movement about a vertical axis relative to said deck plate,
a pick-up arm pivotally mounted on said deck plate,
means for rotating said drive gear during a record changing cycle,
automatic mechanism for raising and lowering said pick-up arm and for pivoting said pick-up arm inwardly and outwardly relative to said turntable,
said automatic mechanism including,
a first reciprocatably rotatable member,
means driven from said drive gear to reciprocatably rotate said first member,
a cam track on said first member engaged by a pick-up arm raising spindle to raise and lower said pick-up arm,
a second reciprocatably rotatable member,
means to releasably connect said second member to said first member to be driven thereby,
means to releasably connect said second member to said pick-up arm vertical spindle to drive said pick-up arm inwardly relative to said turntable,
stop means to arrest rotation of said second member when said pick-up arm is in a predetermined position,
spring means to releasably connect said first member to said pick-up arm vertical spindle to drive said pick-up arm outwardly relative to said turntable,
abutment means on said first member positioned to engage said spring means to limit the angular movement of said spring means,
further stop means to arrest outward movement of said pick-up arm in a predetermined position,
said second reciprocatably member comprising part of a selector plate provided with abutment surfaces positioned to be engaged by an adjustable stop to permit adjustment of said predetermined position at which inward movement of said pick-up arm is arrested,
a record steady lever movable from a first to a second position when there is no record to be played carried on said centre spindle,
means to maintain said selector plate in a switch-off position when said record steady lever is in said second position,
a rotatable element driven from said drive gear,
a switch-off actuating lever movable so as to switch off the record player and adapted to be maintained, by said selector plate when selector plate is in said second position, in a position to engage said element whereby said element causes movement of said actuating lever to switch off the record player,
said means to restrain the selector plate in said position comprising
an arcuate slot formed in said selector plate, said slot having an enlarged portion at one end,
a stop member having an enlarged part of such dimensions as to not pass through a majority of said arcuate slot but to enter said enlarged part,
means coupling said stop member to said record steady lever for normally maintaining said stop member in a position in which the smaller diameter part is aligned with said slot, when said record steady lever is in said first position and for moving said stop member to a position with the larger diameter part engaging the enlarged part of the slot, when said record steady lever is permitted to move to said second position.

13. A record player according to claim 12 wherein said stop member is caused to move to said second position as a result of biasing movement being applied thereto when said record steady lever is moved to its second position, there being a latch plate provided on said first reciprocatably rotatable member which temporarily maintains said stop member in its first position whilst said pick-up arm is moved outwardly to the predetermined position and subsequently permits said stop member to move to its second position.

* * * * *